United States Patent [19]
McLaughlin et al.

[11] 3,931,474
[45] Jan. 6, 1976

[54] TONE INJECTION CIRCUIT

[75] Inventors: Donald W. McLaughlin, Bolingbrook; David Q. Lee, Chicago, both of Ill.

[73] Assignee: GTE Automatic Electric Laboratories Incorporated, Northlake, Ill.

[22] Filed: Dec. 30, 1974

[21] Appl. No.: 537,291

[52] U.S. Cl. ............................ 179/16 AA; 179/84 VF
[51] Int. Cl.² .......................................... H04Q 1/44
[58] Field of Search .......... 179/84 VF, 16 AA, 78 R

[56] References Cited
UNITED STATES PATENTS
3,764,753  10/1973  Wisotzky ........................ 179/84 VF Primary Examiner—William C. Cooper
Attorney, Agent, or Firm—Robert J. Black

[57] ABSTRACT

A precise tone injection circuit for injecting tone signals to a constant current junctor circuit in a two-wire balanced circuit. The tone injection circuit includes a pair of transistors operating as constant current sources feeding the respective ones of the two wires. A phase splitter amplifier couples a tone signal to the base electrodes of the transistors to change the current through their collector electrodes via the emitter circuits thereof at a rate and frequency of the tone signals at the base. Since a two-wire balanced circuit is used, and the injected signal currents to each wire are 180° out-of-phase, in-phase signals, that is, noise and voltage fluctuations, are reduced or rejected.

6 Claims, 1 Drawing Figure

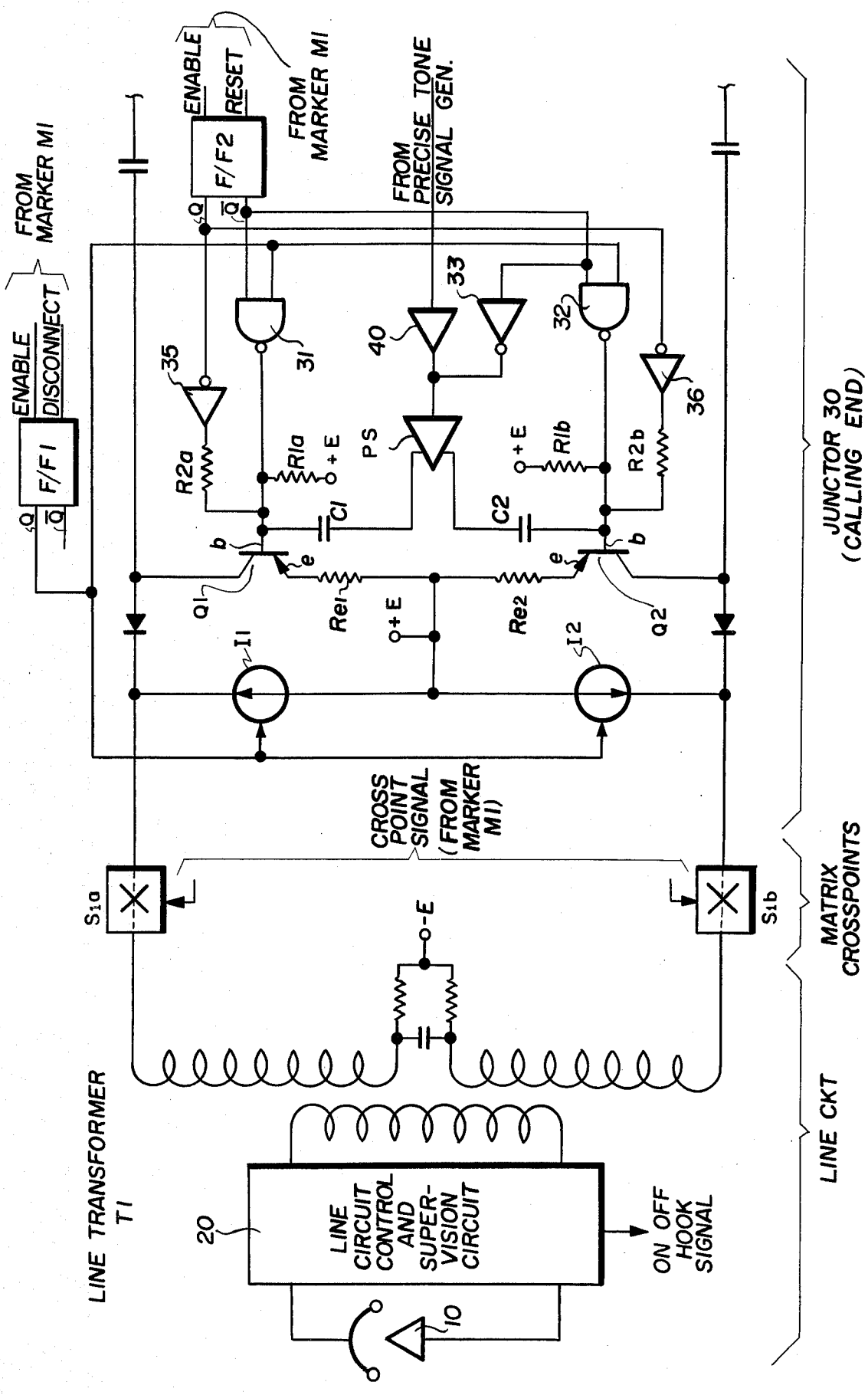

TONE INJECTION CIRCUIT

RELATED APPLICATIONS

The present invention is related to the inventions disclosed in U.S. Pat. Nos. 3,838,223 and 3,838,228; and U.S. patent application, Ser. No. 402,530, filed Oct. 1, 1973, now Pat. No. 3,886,315.

BACKGROUND OF THE INVENTION

This invention relates to telephone communication systems and, more particularly, to an improved electronic private automatic branch exchange (PABX). More particularly still, the invention relates to an improved tone signal injection circuit and method for injecting audio tones for informing calling parties of the progress of a call within a PABX telephone system.

Private automatic branch exchanges traditionally have incorporated all of the switching techniques normally utilized in telephone central offices. Many of these types of private switching systems employ the well-known step-by-step or "Strowger" principle, while still others are of the common control type employing cross bar switches or similar devices as the technique for establishing a path between two stations.

The introduction of electronic techniques and circuitry to the telephone communication field to date has found its greatest utilization in the area of central office switching and signaling transmission. Until recently, the usage of these techniques in PABX telephone systems has been limited primarily because of cost considerations. Certain recent developments primarily in the area of common control equipment and particularly memory circuitry have made the design of electronic PABX's more attractive economically. Use of stored program common control and solid state devices permits a considerable reduction in the amount of equipment installed in customer premises.

In the above-identified related patents and application, the described private automatic branch exchange is electronically implemented and employs common control equipment of a generally conventional type and operation. The system is a two-wire system using junctors as a means of connecting two line circuits together via a solid state crosspoint matrix. The junctor has two ports on the outlet side of the matrix and the lines appear as inlets on the matrix.

The preferred embodiment of the invention disclosed herein is for use in a PABX system of the type disclosed in these related patents and application, and the latter are incorporated herein and made a part hereof as though fully set forth.

In such PABX systems, the calling party is informed by various different audio tones of the progress of a call within the system. For example, a returned dial tone means the equipment is ready to accept dialed digits or TCMF signals, a line busy tone indicates that the called line has been reached, but that it is busy, a reorder tone signifies that all outgoing CO trunks (PABX systems) are busy and the caller should wait, and then retry the call. A tone also is returned if the called telephone is not available. In the case of a dial tone and not available tone, tones of different frequencies are used. Tones for line busy and reorder are identical except their rates of interruptions are different.

Since the junctor circuits in the subject PABX system are areas of transmission path circuit concentration, tone injection at this point would reduce circuit redundancy. If solid state devices, that is, PNPN, SCR, etc. are used as crosspoints for the transmission path, the devices' minimum hold current must be exceeded to assure the transmission path is maintained. Since junctor circuits are transformer coupled to the line circuits, any current or voltage fluctuation at the junctor or in the transmission path is coupled and reappears as audio interference at the line circuit.

If a constant current is generated by a constant current source in the junctor circuit, and is coupled to the line transformer secondary via the solid state crosspoints, current fluctuations can be reduced and it can be assured that the transmission path is maintained.

Since transistors are basically current devices, such a constant current source or generator can be designed using a transistor. For example, if the current through the transistor's emitter is held constant, the output current at its collector circuit is essentially the same regardless of the collector's resistor load (within the applied voltage and current rating of the transistor used). The emitter current, in turn, is controlled by the transistor's base circuit.

In accordance with the present invention, a precise tone injection circuit can be provided, by injecting tone signals at the transistor's base circuit to change the current through the collector via the emitter circuit at a rate and frequency covered by the tone signal at the base. By current modulating the constant current source, the output frequencies are not altered or distorted. To minimize noise pick up, within the transmission path, a balanced two-wire circuit is used to the line transformer. In this fashion, signals of the same amplitude and phase normally created by noise or voltage fluctuation are rejected.

The disclosed precise tone injection circuit therefore provides the function to inject tone signals to a constant current solid state junctor circuit. Since a two-wire balanced circuit is used, and the injected signal currents to each wire are 180° out of phase, in phase signals, i.e., noise and voltage fluctuations, are reduced or rejected. In addition, this circuit reverts to a constant current generator when tone signal generation is not required.

Accordingly, it is an object of the present invention to provide an improved precise tone injection circuit.

Another object is to provide an improved precise tone injection circuit and method, by current modulation on balanced two-wire solid state crosspoint constant current junctor circuits.

Referring now to the drawing which is an electrical schematic illustrating the precise tone injection circuit of the present invention, and the manner in which it functions to inject tone signals to the constant current solid state junctor circuit, it can be seen that a calling party 10 is coupled by a line circuit control and supervision circuit 20 and a line transformer T-1 associated with the calling party to a junctor circuit 30 (at the calling end) via the solid state crosspoints $S1_a$ and $S1_b$ of a crosspoint matrix. The connection is established under the control of a marker (not shown) which couples cross-point enable signals to the matrix crosspoints $S1_a$ and $S1_b$ and an enable signal to the constant current control flip-flop F/F1. The constant current control flip-flop F/F1, by means of a logic signal on its output lead Q, turns on the constant current generators $I_1$ and $I_2$. The above connections all are established, in the manner described in the above-identified U.S. Pat. Nos. 3,838,223 and 3,838,228 and application Ser. No.

402,530, filed Oct. 1, 1973.

The precise tone injection circuit of the present invention comprises, generally, the pair of transistors Q1 and Q2, which generally correspond to two of the constant current sources disclosed in the above-identified related patents and patent application, a pair of NAND gates 31 and 32, a phase splitter amplifier PS, an amplifier 40, three invertors 33, 35 and 36, a tone injection control flip-flop F/F2, and transistor biasing networks including the resistors $R1_a$ and $R2_a$, and $R1_b$ and $R2_b$. A precise tone signal generator which is not shown and forms no part of the present invention is coupled to the amplifier 40 and provides the tone signals to be injected, in the manner more fully described below. The precise tone signal generator can be of a conventional type. The tone injection control flip-flop F/F2, in the illustrated embodiment, is controlled by an ENABLE and a RESET pulse from the system's marker, however, in other systems it can be controlled by any appropriate external means within the system to inject the tone signals at the desired times, or circumstances. In this respect, the means for controlling the tone injection control flip-flop F/F2 forms no part of the invention, for it may be controlled by various different apparatus. Also, in the illustrated embodiment and the description below, NAND logic is used, however, it is apparent that AND logic also could be used, with appropriate changes in the logic gates and the like being made.

When the constant current control flip-flop F/F1 is enabled, the logic signal on its output Q goes to a logic 1. This logic 1 signal is coupled to and turns on the constant current generators $I_1$ and $I_2$, as described above. This logic 1 signal also is coupled to the input 2 of each of the NAND gates 31 and 32.

The tone injection control flip-flop F/F2, at this time, is in the reset state and a logic 1 is present on its $\overline{Q}$ output. This logic 1 is coupled to the input 1 of each of the NAND gates 31 and 32. With both inputs of the NAND gates 31 and 32 being at a logic 1, these gates each output a logic 0 signal which are coupled to and force the respective transistors Q1 and Q2 to turn on. The logic 1 on the $\overline{Q}$ output of the tone injection control flip-flop F/F2 also is coupled through an invertor 33 which inverts this input and outputs a logic 0 that is coupled to the input of the phase splitter amplifier PS. This logic 0 at the input inhibits the tone signal to the amplifier PS.

The current at the emitters e of transistors Q1 and Q2 is controlled by the voltage across their emitter resistors $R_{e1}$ and $R_{e2}$, respectively, i.e., +E to $E_1$ and +E to $E_2$. In the conducting state, the emitter voltages $e_1$ and $e_2$ are approximately equal to the base voltage $e_a$ and $e_b$, respectively. With high beta transistors, the collector currents $I_{a1}$ and $I_{b2}$, are approximately equal to the emitter currents, provided the transistors are not in the saturated or cut off state, hence the emitter and collector currents are controlled by the voltages $e_a$ and $e_b$ at the bases b of the transistors Q1 and Q2. In this respect, the operation is generally as described in the above-identified patents and application, however, in this case, the constant current sources comprising the transistors Q1 and Q2 are turned on immediately and, in effect, supplement the constant current outputs of the sources $I_1$ and $I_2$. In the previous disclosures, the transistors Q1 and Q2 are operated in a turn-on and a turn-off mode type of operation when a signal is to be injected.

In the instant case, to inject a tone signal, the tone injection control flip-flop F/F2 is enabled, by the marker or other external means. When enabled, a logic 1 and a logic 0 appear on its output Q and $\overline{Q}$, respectively. The logic 0 on the $\overline{Q}$ output of the tone injection control flip-flop F/F2 is coupled to the input 1 of each of the NAND gates 31 and 32 to force open these gates to provide logic 1 outputs therefrom. The logic 1 on the Q output of the tone injection control flip-flop F/F2 is coupled to each of the invertors 35 and 36, and the outputs thereof are logic 0's. With the outputs of the invertors 35 and 36 at a logic 0 and the outputs of the NAND gates 31 and 32 at a logic 1, the resistors $R1_a$ and $R2_a$ and the resistors $R1_b$ and $R2_b$ provide a bias network to the transistors Q1 and Q2, respectively, placing them in a linear mode of operation.

The logic 0 on the $\overline{Q}$ output of the tone injection control flip-flop F/F2 also is coupled to the invertor 33. With a logic 1 output from the invertor 33, tones from the amplifier 40 are passed through to the phase splitter amplifier PS. The latter's output signal is coupled through the capacitors C1 and C2 to the bases of transistor current generators Q1 and Q2, respectively. Since the transistors Q1 and Q2 are in a linear mode, the output current of the transistors Q1 and Q2 vary with the AC tone signals from the precise tone signal generator (not shown), coupled to the amplifier 40. This varying current is passed to the line transformer T1 and coupled to the calling subscribers as tone signals. Since a two-wire balanced circuit is used, and the injected signal currents to each wire is 180° out-of-phase, in-phase signals, i.e., noise or voltage fluctuations are reduced or rejected. Furthermore, by current modulating the constant current sources, i.e., transistors Q1 and Q2, the output tone frequncies are not altered or distorted.

After the tone signal is injected, the tone injection control flip-flop F/F2 again is reset and its Q and $\overline{Q}$ outputs go to a logic 0 and a logic 1, respectively. At this time, the tone injection circuit reverts to a constant current generator. When the next, or another, tone is to be injected, the tone injection control flip-flop F/F2 again is enabled, and the tone is injected, as described above.

It will thus be seen that the objects set forth above, among those made apparent from the preceding description, are efficiently attained and certain changes may be made in the above construction. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. In a communication system including a pair of terminating circuits coupled to a junctor via a matrix, said system being a two-wire system and each of said terminating circuits appearing as an inlet on said matrix and said junctor having two ports on the outlet of said matrix, each of said terminating circuits including a fixed resistance in one of said two wires and said junctor including a pair of constant current sources feeding said fixed resistances in the respective ones of said terminating circuits and thereby providing the holding current for holding up the connections through said matrix from said junctor to said terminating circuits, the release of said connections being under control of said junctor, and a system controller, the improvement comprising a tone signal injection circuit within said junctor, said tone signal injection circuit comprising a pair of transistors operating as constant current sources and supplying a constant current to the respective ones of said two wires; biasing means for biasing the respective ones of said pair of transistors to operate in a linear mode; phase splitter amplifier means for coupling tone signals to the respective ones of said transistors to modulate the constant current to the respective ones of said two wires, whereby the tone signals are coupled to a terminating circuit.

2. The improvement of claim 1, wherein said phase splitter amplifier means couples said tone signals to the base circuit of the respective ones of said pair of transistors to change the current through the collector via the emitter circuit at a rate and frequency of the tone signal at the base circuit thereof.

3. The improvement of claim 1, further including gating means normally operative to render said pair of transistors conductive to operate as constant current sources and operable to couple said biasing means with said pair of transistors to bias said transistors to operate in a linear mode; and means for operating said gating means to couple said biasing means with said pair of transistors.

4. The improvement of claim 3, wherein said means for operating said gating means comprises control means operated by external means when a tone signal is to be injected, said control means normally being operated to operate said gating means to render said pair of transistors conductive to operate as constant current sources, said control means being operated by said external means when a tone signal is to be injected to operate said gating means to couple said biasing means with said pair of transistors to bias said transistors to operate in a linear mode.

5. The improvement of claim 4, further including means controlled by said control means to inhibit the tone signal input to said phase splitter amplifier.

6. The improvement of claim 3, wherein said control means comprises a flip-flop current.

* * * * *